July 14, 1925.

L. R. GOLLADAY

CIRCUIT INTERRUPTER

Filed June 22, 1922

1,545,754

WITNESSES:
C. N. Cochran
A. Martin

INVENTOR
Lawrence R. Golladay.
BY
Wesley G. Carr
ATTORNEY

Patented July 14, 1925.

1,545,754

UNITED STATES PATENT OFFICE.

LAWRENCE R. GOLLADAY, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT INTERRUPTER.

Application filed June 22, 1922. Serial No. 570,246.

*To all whom it may concern:*

Be it known that I, LAWRENCE R. GOLLADAY, a citizen of the United States, and a resident of Wilkinsburg, in the county of Allegheny and State of Pennsylvania, have invented a new and useful Improvement in Circuit Interrupters, of which the following is a specification.

My invention relates to circuit interrupters and particularly to circuit interrupters for use in connection with alternating-current circuits, or in connection with direct-current circuits wherein the direction of current flow is sometimes reversed.

The object of my invention is to provide a device of the above indicated character that shall respond very quickly to short circuits or to currents of predetermined value, it being more specifically intended to open the circuit during the first half cycle of the current wave following a fault in the circuit.

Figure 1:
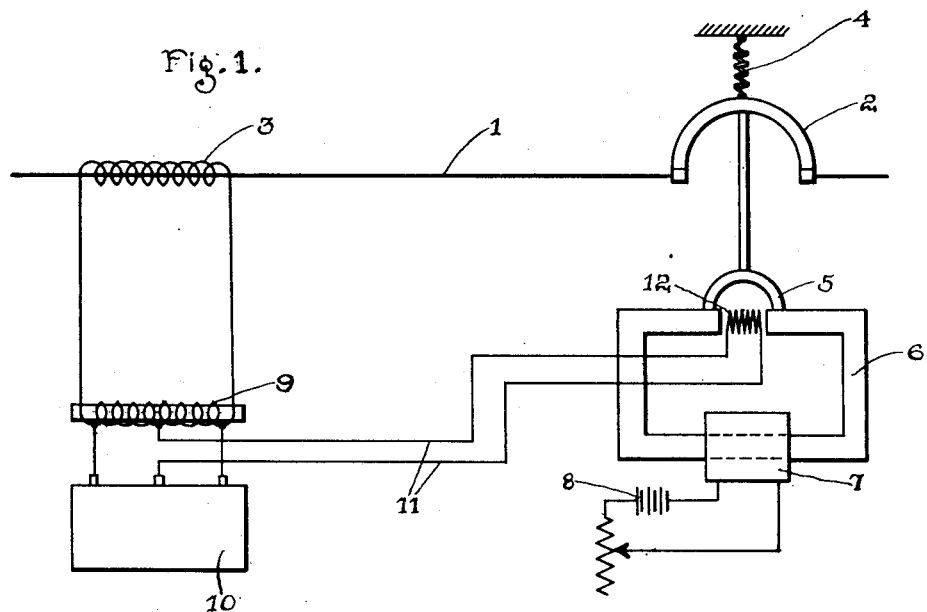
Figure 2:
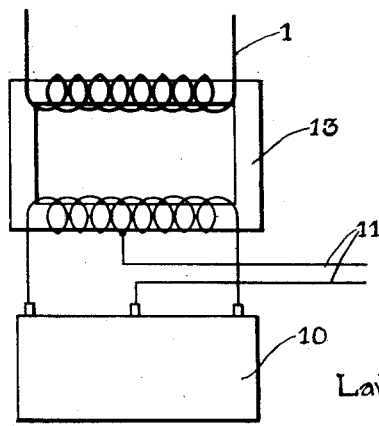

Figure 1 of the accompanying drawing is a diagrammatic view of an interrupter embodying my invention, and Fig. 2 is a similar view showing a portion of the device of Fig 1, in modified form.

A main circuit 1 is provided with a bridging member 2 and a current transformer 3. A spring 4 tends to move the bridging member 2 to open position.

The bridging member 2 is normally maintained in closed position by an armature 5 that co-operates with a core 6 which is energized by a coil 7, through which current flows from a battery or other source of current supply 8. The magnetic flux set up by the coils 7 normally follows a path through the armature 5 and serves to hold the bridging member closed against the tension of the spring 4.

A reactor 9 is connected across the transformer 3 and co-operates with a rectifier 10 to supply an auxiliary circuit 11 with direct current. The rectifier may be of the electrolytic self-starting type, and will, of course, effect a flow of current through the circuit 11 in but one direction, regardless of the direction in which current passes through the reactor 9. The circuit 11 is provided with a coil 12 wound in such manner that, when energized, it produces a magnetic flux across the air gap of the core 6 in which it is located, thereby diverting such flux from the armature 5 and permitting the spring 4 to move the bridging member 2 to open position.

In the event of a surge of current, as by a short circuit, occurring in the main circuit 1, the reactor will build up an electromotive force across the rectifier 10 and cause an actuation of the interrupter, as above explained.

The reactor 9 and the coil 12 may be so proportioned that the magnetic flux present in the core 6 will be deflected across the gap only in response to a current of predetermined value in the main circuit. This deflection, in the case of alternating currents, will occur during the first half cycle of a current wave following a fault in the main circuit. I, therefore, provide a simplified form of device wherein the circuit interrupter will be caused to open no matter in which direction the current may be flowing through the main circuit at the time an overload occurs in the said circuit.

In the form shown in Fig. 2, a transformer 13 is substituted for the transformer 3 and the reactor 9 of Fig. 2, the operation being substantially the same in both forms of device.

Various changes in detail and general arrangement may be made without departing from the spirit and scope of the invention, as defined in the accompanying claims.

I claim as my invention:

1. The combination with an alternating-current circuit and an interrupter therefor, of a holding magnet for the interrupter, a unidirectional current means for energizing the magnet, and means responsive to a current of predetermined value in the said circuit for neutralizing the effective holding force of the said magnet during the first half cycle of a current wave.

2. The combination with an alternating-current circuit and an interrupter therefor, of an electromagnet provided with an armature for actuating the interrupter, a winding for actuating the armature, and means responsive to a current of predetermined value in the said circuit during the first half cycle of a current wave for rendering the armature non-responsive to the said winding.

3. The combination with an alternating-current circuit, of an interrupter therefor provided with means for biasing it to open position, a holding coil for maintaining the interrupter in closed position, a current transformer in the said circuit, a direct-current circuit, means for rendering the holding coil ineffective to hold the interrupter closed upon energization of the direct-current circuit, and means connected in series with the transformer and the direct current circuit for effecting a flow of current in such circuit when the current in the first-named circuit reaches a predetermined value.

4. The combination with a main circuit and an interrupter therefor, of means for biasing the interrupter toward open position, a core provided with an air gap, a coil for energizing the core, an armature for bridging the gap and having connection with the interrupter to hold it in closed position, a deflecting coil located adjacent to the said air gap, and means controlled by conditions in the circuit for energizing the deflecting coil in one direction only.

5. The combination with a main circuit and an interrupter therefor, of a magnetically-operated holding member for maintaining the interrupter in closed position, a current transformer connected to the circuit, a reactor connected across the transformer, a rectifier in series with the reactor, and a deflecting coil for neutralizing the holding force of the said magnetically-operated member and energized by the said reactor and rectifier.

6. The combination with a main circuit and an interrupter therefor, of a core provided with an air gap, an armature for bridging the air gap and maintaining the interrupter in closed position, means for energizing the core, a coil located in the said air gap, and means controlled by conditions in the main circuit for causing a flow of current through the said coil in one direction only.

7. The combination with an alternating-current circuit and an interrupter therefor, of a holding magnet for the interrupter energized by uni-directional current, a rectifier energized by the alternating-current circuit, and means energized by the rectifier for neutralizing the effective holding force of the said magnet.

8. The combination with an alternating-current circuit and an interrupter therefor, of a holding magnet for the interrupter energized by uni-directional current, a rectifier energized by the alternating-current circuit, and means energized by the rectifier for neutralizing the effective holding force of the said magnet during the first half cycle of an abnormal current wave.

9. The combination with an alternating-current circuit and an interrupter therefor, of a holding magnet for the interrupter energized by uni-directional current, means energized by the alternating-current circuit for producing uni-directional current proportional to that of the alternating-current circuit and means energized thereby for neutralizing the effective holding force of the said magnet.

10. The combination with an alternating-current circuit and an interrupter therefor, of a holding magnet for the interrupter energized by uni-directional current, and means proportionally responsive to the alternating current for neutralizing the effective holding force of the said magnet during the first half cycle of a predetermined abnormal alternating-current wave.

In testimony whereof, I have hereunto subscribed my name this 15th day of June 1922.

LAWRENCE R. GOLLADAY.